(12) United States Patent
Cherian et al.

(10) Patent No.: US 8,868,038 B2
(45) Date of Patent: *Oct. 21, 2014

(54) METHODS OF AND SYSTEMS FOR REMOTELY CONFIGURING A WIRELESS DEVICE

(71) Applicant: Qualcomm Incorporated, San Diego, CA (US)

(72) Inventors: George Cherian, San Diego, CA (US); Anand Palanigounder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/627,943

(22) Filed: Sep. 26, 2012

(65) Prior Publication Data

US 2013/0081113 A1 Mar. 28, 2013

Related U.S. Application Data

(63) Continuation of application No. 13/589,623, filed on Aug. 20, 2012.

(60) Provisional application No. 61/539,817, filed on Sep. 27, 2011, provisional application No. 61/616,960, filed on Mar. 28, 2012.

(51) Int. Cl.
| | |
|---|---|
| H04M 1/66 | (2006.01) |
| G06F 21/44 | (2013.01) |
| H04L 12/24 | (2006.01) |
| H04L 29/06 | (2006.01) |
| G06F 15/177 | (2006.01) |
| H04W 48/16 | (2009.01) |
| H04W 12/04 | (2009.01) |

(52) U.S. Cl.
CPC ............... *H04W 48/16* (2013.01); *G06F 21/44* (2013.01); *H04L 41/0886* (2013.01); *H04L 65/1066* (2013.01); *H04L 63/062* (2013.01); *H04L 12/2424* (2013.01); *G06F 15/177* (2013.01); *H04L 63/18* (2013.01); *H04W 12/04* (2013.01)

USPC .......... 455/411; 455/410; 455/418; 455/41.2; 370/338

(58) Field of Classification Search
CPC ... H04W 4/005; H04W 84/12; H04L 41/0806
USPC .................... 455/41.1, 41.2, 416, 410–414.4, 455/418–420; 370/331–338; 709/203–206
See application file for complete search history.

(56) References Cited

U.S. PATENT DOCUMENTS

| 5,673,317 A | 9/1997 | Cooper |
| 5,964,877 A | 10/1999 | Victor et al. |

(Continued)

FOREIGN PATENT DOCUMENTS

| DE | 102010010760 A1 | 9/2011 |
| EP | 1739880 A1 | 1/2007 |
| EP | 1748669 A1 | 1/2007 |

OTHER PUBLICATIONS

International Search Report and Written Opinion—PCT/US2012/057469—ISA/EPO—Feb. 27, 2013.

(Continued)

*Primary Examiner* — Sharad Rampuria
(74) *Attorney, Agent, or Firm* — S. Hossain Beladi

(57) ABSTRACT

A particular method includes transmitting a message from a first device to a second device. The message includes first information associated with identification of the first device. The first information enables the second device to obtain access data. The method also includes establishing a first communication link between the first device and the second device based on the access data. The method further includes receiving, via the first communication link, second information associated with establishment of a second communication link between the first device and a third device. The method also includes configuring the first device to establish the second communication link between the first device and the third device based on the second information.

36 Claims, 7 Drawing Sheets

(56) References Cited

U.S. PATENT DOCUMENTS

| | | | |
|---|---|---|---|
| 7,103,359 B1* | 9/2006 | Heinonen et al. | 455/436 |
| 7,616,594 B2 | 11/2009 | Roberts et al. | |
| 7,715,796 B2* | 5/2010 | Honda et al. | 455/41.2 |
| 7,925,249 B2* | 4/2011 | Funk et al. | 455/419 |
| 8,036,639 B2 | 10/2011 | Carter et al. | |
| 8,041,035 B2 | 10/2011 | Miller | |
| 8,050,229 B2 | 11/2011 | Miao et al. | |
| 8,073,428 B2* | 12/2011 | Khetawat et al. | 455/411 |
| 8,195,140 B2 | 6/2012 | Knezevic | |
| 8,340,711 B1* | 12/2012 | Glass et al. | 455/552.1 |
| 8,381,268 B2 | 2/2013 | Winget et al. | |
| 8,447,978 B2 | 5/2013 | Shiba | |
| 8,457,797 B2 | 6/2013 | Imes et al. | |
| 8,472,935 B1 | 6/2013 | Fujisaki | |
| 8,670,755 B2 | 3/2014 | Knezevic | |
| 8,688,077 B2* | 4/2014 | Fartmann et al. | 455/411 |
| 8,744,408 B2* | 6/2014 | Kimura et al. | 455/411 |
| 2005/0054329 A1 | 3/2005 | Kokudo | |
| 2005/0270989 A1 | 12/2005 | Park et al. | |
| 2007/0079113 A1 | 4/2007 | Kulkarni et al. | |
| 2007/0101136 A1 | 5/2007 | Lai et al. | |
| 2009/0093232 A1 | 4/2009 | Gupta et al. | |
| 2009/0205028 A1 | 8/2009 | Smeets et al. | |
| 2010/0082988 A1 | 4/2010 | Huebner et al. | |
| 2010/0304716 A1 | 12/2010 | Hoeksel et al. | |
| 2011/0040862 A1 | 2/2011 | Nakajima | |
| 2011/0072101 A1 | 3/2011 | Forssell et al. | |
| 2011/0110521 A1 | 5/2011 | Yang et al. | |
| 2011/0149930 A1 | 6/2011 | Sakai | |
| 2011/0237224 A1 | 9/2011 | Coppinger | |
| 2011/0238844 A1 | 9/2011 | Lu et al. | |
| 2011/0271110 A1 | 11/2011 | Ohba et al. | |
| 2011/0280227 A1 | 11/2011 | McCann et al. | |
| 2012/0044865 A1 | 2/2012 | Singh et al. | |
| 2012/0047551 A1 | 2/2012 | Pattar et al. | |
| 2012/0100803 A1 | 4/2012 | Suumaki et al. | |
| 2012/0106449 A1 | 5/2012 | Shibuya | |
| 2013/0036231 A1 | 2/2013 | Suumaeki | |
| 2013/0217359 A1 | 8/2013 | Cherian et al. | |
| 2013/0242951 A1* | 9/2013 | Lee et al. | 370/336 |
| 2013/0286889 A1 | 10/2013 | Cherian et al. | |
| 2013/0308490 A1* | 11/2013 | Lim et al. | 370/252 |
| 2013/0309971 A1 | 11/2013 | Kiukkonen et al. | |
| 2014/0023053 A1* | 1/2014 | Park et al. | 370/336 |

OTHER PUBLICATIONS

Ohba, Y., et al., "Extensible Authentication Protocol (EAP) Early Authentication Problem Statement; rfc5836.txt", Internet Engineering Task Force, IETF; Standard, Internet Society (ISOC) 4, Rue Des Falaises CH-1205 Geneva, Switzerland, Apr. 27, 2010, pp. 1-20, XP015070773.

3rd Generation Partnership Project; Technical Specification Group Services and System Aspects; Feasibility study on the security aspects, of remote provisioning and change of subscription for Machine to Machine (M2M) equipment (Release 9 ), 3GPP Standard; 3GPP TR 33.812, 3rd Generation Partnership Project (3GPP), Mobile Competence Centre ; 650, Route Des Lucioles.;. F-06921 Sophia-Antipolis Cedex- ; France, No. V9.2.0, Jun. 22, 2010, pp. 1-87, XP050441986, [retrieved-on Jun. 22, 2010].

"Wi-Fi Protected Setup Specification Version 1.oh", Dec. 31, 2006, pp. 1-110, XP55031152, Internet Retrieved from the Internet: URL:http://gpl.back2roots.org/source/puma5 /netgear/CG3200-1TDNDS_GPL/ap/apps/wpa2/original/Wi-Fi Protected Setup Specification1. Oh.pdf [retrieved on Jun. 26, 2012].

* cited by examiner

METHODS OF AND SYSTEMS FOR REMOTELY CONFIGURING A WIRELESS DEVICE

I. CROSS REFERENCE TO RELATED APPLICATIONS

The present application claims priority from commonly owned U.S. Provisional Patent Application 61/539,817 filed Sep. 27, 2011 and titled METHODS OF AND SYSTEMS FOR REMOTELY CONFIGURING A WIRELESS DEVICE, claims priority from commonly owned U.S. Provisional Patent Application 61/616,960 filed Mar. 28, 2012 and titled AUTOMATIC CONFIGURATION OF A WIRELESS DEVICE, and claims priority, as a continuation application, from commonly owned U.S. patent application Ser. No. 13/589,623 filed Aug. 20, 2012 and titled AUTOMATIC CONFIGURATION OF A WIRELESS DEVICE, the contents of each application of which are expressly incorporated herein by reference in their entirety.

II. FIELD OF THE DISCLOSURE

The present application relates generally to communication systems and more specifically to methods and devices for configuring a wireless device.

III. BACKGROUND

In many telecommunication systems, communications networks are used to exchange messages among several interacting spatially-separated devices. Networks may be classified according to geographic scope, which could be, for example, a metropolitan area, a local area, or a personal area. Such networks are designated respectively as a wide area network (WAN), a metropolitan area network (MAN), a local area network (LAN), or a personal area network (PAN). Networks also differ according to switching techniques and/or routing techniques used to interconnect various network nodes and devices (e.g., circuit switching vs. packet switching), a type of physical media employed for transmission (e.g., wired vs. wireless), and a set of communication protocols used (e.g., Internet protocol suite, Synchronous Optical Networking (SONET), Ethernet, etc.).

Wireless networks are often used when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

As networks proliferate, the types of network elements connected thereto also expands. One type of network element being introduced are machine-to-machine (M2M) elements. An example of a M2M element is a refrigerator having wireless communication capabilities. Because a M2M capable refrigerator or other device may not have a user input to program the device, establishing the M2M device in a wireless network may be problematic. Configuring the M2M device may involve manual intervention and/or a close physical proximity to the M2M device, which are not always practical. For example, some M2M devices (e.g., a refrigerator or a sprinkler) may not include user interfaces for manual interaction. As another example, M2M devices that are relatively small (e.g., compact), may not include multiple radio interfaces to support Wi-Fi communication and another type of communication (e.g., Bluetooth). As a further example, once a particular M2M device is installed, accessing the device (e.g., physically or within a small wireless range) to reconfigure (reprogram) the M2M device may not possible or practical.

Improvements to communication systems to extend the network coverage and allow various communication devices, such as a M2M device, to access the network are desirable.

IV. SUMMARY

A machine-to-machine (M2M) device may be remotely configurable by a particular station (STA) to enable the M2M device to establish a communication link (e.g., associate) with a particular access point (AP). The particular AP may be part of a network with which the M2M device is to be connected. To establish communication with the particular AP, the M2M device may initially function as a second AP to acquire information from the particular STA, where the acquired information facilitates communication with the particular AP. After acquiring the information from the particular STA, the M2M device may operate as a second STA to communicate, using the acquired information, with the particular AP.

When operating as the AP, the M2M device may be discoverable by other STAs. The particular STA may discover the M2M device and obtain identifying information for the M2M device. Based on the identifying information of the M2M device, the particular STA may acquire security information for the M2M device from a third party (e.g., a trusted third party), such as a manufacturer of the M2M device. After receiving the security information, the particular STA may establish a communication link (e.g., a wireless communication link) with (e.g., associate with) the M2M device (while the M2M device is operating as the second AP) and program (e.g., configure) the M2M device to associate with the particular AP. After the M2M device is configured to associate with the particular AP, the M2M device may operate as the second STA and establish a communication link (e.g., a wireless communication link) with the particular AP based on the security information provided from the particular STA. Accordingly, the M2M device may be remotely configured by the particular STA to enable the M2M device to establish a communication link with the particular AP and connect to a wireless network provided by the particular AP.

In a particular embodiment, a method includes transmitting a message from a first device to a second device. The message includes first information associated with identification of the first device. The first information enables the second device to obtain access data. The method further includes establishing a first communication link between the first device and the second device based on the access data. The method includes receiving, via the first communication link, second information associated with establishment of a second communication link between the first device and a third device. The method further includes configuring the first device to establish the second communication link between the first device and the third device based on the second information.

In another particular embodiment, a wireless communication device includes a transmitter configured to transmit a message from a first device to a second device. The message includes first information associated with identification of the first device. The first information enables the second device to obtain access data. The wireless communication device includes a receiver configured to receive, via a first communication link between the first device and the second device based on the access data, second information associated with establishment of a second communication link between the first device and a third device. The wireless communication device further includes a processor configured to configure the first device to establish the second communication link between the first device and the third device based on the second information.

In another particular embodiment, an apparatus includes means for transmitting a message from a first device to a second device. The message includes first information associated with identification of the first device. The first information enables the second device to obtain access data. The apparatus further includes means for establishing a first communication link between the first device and the second device based on the access data. The apparatus further includes means for receiving, via the first communication link, second information associated with establishment of a second communication link between the first device and a third device. The apparatus includes means for configuring the first device to establish the second communication link between the first device and the third device based on the second information.

In another particular embodiment, a processor-readable medium includes instructions that, when executed by a processor, cause the processor to transmit a message from a first device to a second device. The message includes first information associated with identification of the first device. The first information enables the second device to obtain access data. The instructions further cause the processor to receive, via a first communication link between the first device and the second device based on the access data, second information associated with establishment of a second communication link between the first device and a third device. The instructions further cause the processor to configure the first device to establish the second communication link between the first device and the third device based on the second information.

In another particular embodiment, a method includes receiving, from a first device, a message at a second device. The message includes first information that identifies the first device. The method further includes obtaining access data associated with establishing a first communication link between the first device and the second device. The method further includes establishing the first communication link between the first device and the second device based on the message. The method includes transmitting to the first device, via the first communication link, second information associated with establishment of a second communication link between the first device and a third device.

In another particular embodiment, a wireless communication device includes a receiver configured to receive, from a first device, a message at a second device. The message includes first information that identifies the first device. The receiver is further configured to receive access data associated with establishing a first communication link between the first device and the second device. The wireless communication device further includes a processor configured to generate instructions to establish the first communication link between the first device and the second device based on the message. The wireless communication device includes a transmitter configured to transmit to the first device, via the first communication link, second information associated with establishment of a second communication link between the first device and a third device.

In another particular embodiment, an apparatus includes means for receiving, from a first device, a message at a second device. The message includes first information that identifies the first device. The apparatus further includes means for obtaining access data associated with establishing a first communication link between the first device and the second device. The apparatus includes means for establishing the first communication link between the first device and the second device based on the message. The apparatus includes means for transmitting to the first device, via the first communication link, second information associated with establishment of a second communication link between the first device and a third device.

In another particular embodiment, a processor-readable medium includes instructions that, when executed by a processor, cause the processor to receive, from a first device, a message at a second device. The message includes first information that identifies the first device. The instructions further cause the processor to receive access data associated with establishing a first communication link between the first device and the second device. The instructions further cause the processor to establish the first communication link between the first device and the second device based on the message. The instructions further cause the processor to transmit to the first device, via the first communication link, second information associated with establishment of a second communication link between the first device and a third device.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
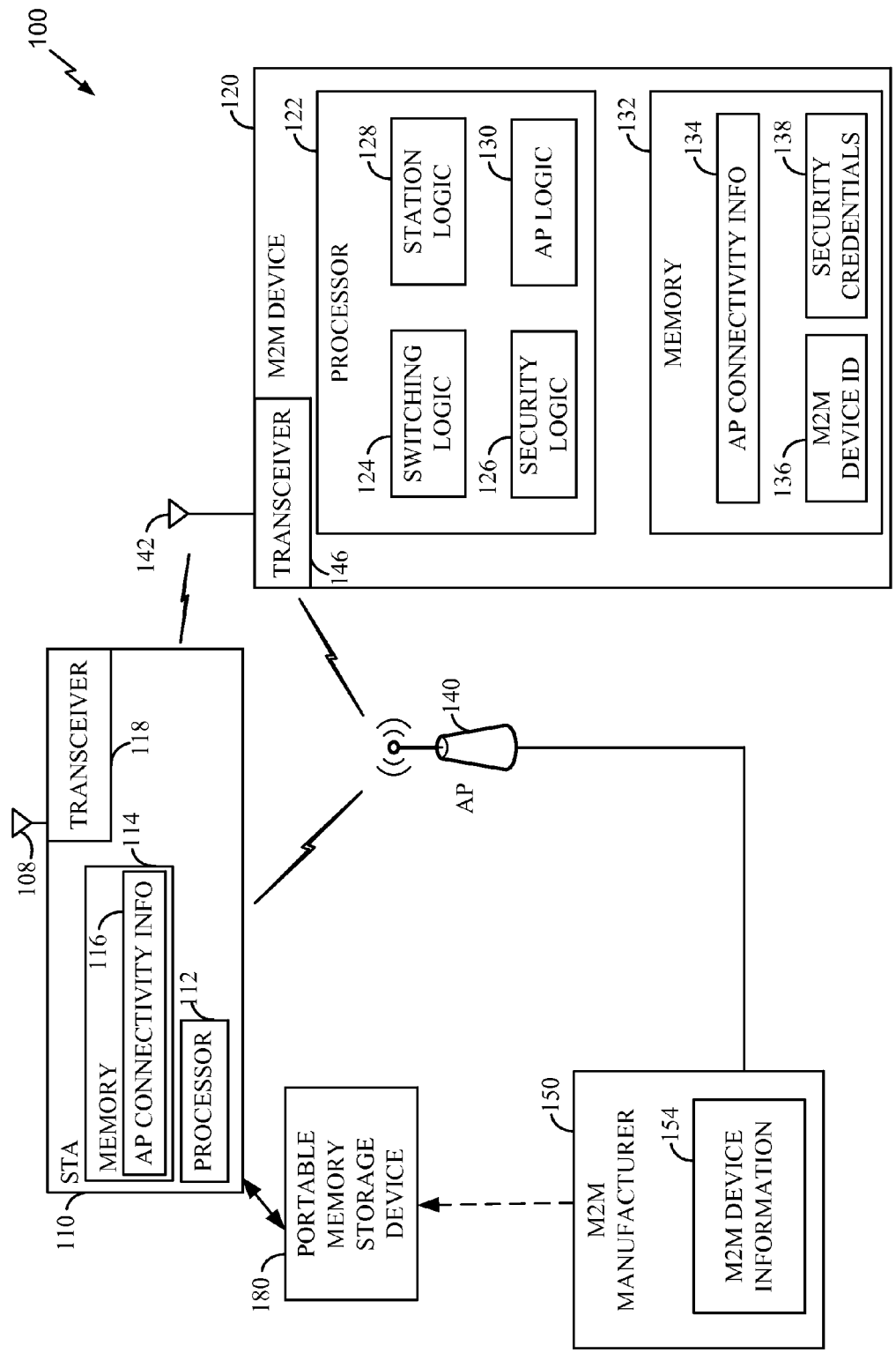
FIG. 1 is a diagram to illustrate an exemplary communication system.

Referring to FIG. 1, a diagram of an exemplary communication system 100 is illustrated. The communication system 100 may include a station (STA) 110, a machine-to-machine (M2M) device 120, an access point (AP) 140, and a M2M manufacturer 150.

A machine-to-machine device, such as the M2M device 120, may be remotely configurable to extend coverage of communication within the communication system 100. The M2M device 120 may be remotely configured by a station, such as the STA 110, to enable the M2M device 120 to establish a communication link (e.g., associate) with a particular access point (e.g., the access point 140) in the communication system 100. The particular AP may be part of a network with which the M2M device 120 is to be connected. The M2M device 120 may be operable to function as a STA and/or as an AP.

In a particular embodiment, when operating as an AP, the M2M device 120 may be discoverable by other STAs. A particular STA, such as the STA 110, may discover the M2M device 120 and obtain identifying information for the M2M device 120. Based on the identifying information of the M2M device 120, the STA 110 may acquire security information for the M2M device 120 from a third party (e.g., a trusted third party), such as a manufacturer (e.g., the M2M manufacturer 150) of the M2M device 120. After receiving the security information, the STA 110 may establish a communication link (e.g., a wireless communication link) with (e.g., associate with) the M2M device 120, which is operating as an AP. The STA 110 may program (e.g., configure) the M2M device 120 to associate with the AP 140. For example, the STA 110 may send AP connectivity information 116 to the M2M device 120. The AP connectivity information 116 may include security information or other information that may be used to establish a communication link between the M2M device 120 (operating as a STA) and the AP 140.

After the M2M device 120 is configured to associate with the AP 140, the M2M device may operate as a STA and establish a communication link (e.g., a wireless communication link) with the AP 140 based on the information provided from the STA 110. Accordingly, the M2M device 120 may be remotely configured (or programmed) by the STA 110 to enable the M2M device to establish a communication link with the particular AP and to wireless connect to the AP 140.

The STA 110 may be a station that includes, is implemented as, or is known as an access terminal ("AT"), a subscriber station, a subscriber unit, a mobile station, a remote station, a remote terminal, a user terminal, a user agent, a user device, user equipment, or some other terminology. In some implementations an access terminal may include a communication device such as cellular telephone, a telephone, a Session Initiation Protocol ("SIP") phone, a wireless local loop ("WLL") station, a personal digital assistant ("PDA"), a handheld device, or some other suitable processing device connected to a modem.

The STA 110 may include a processor 112 and a memory 114. The processor 112 may include one or more processors that may control operation of the STA 110. The memory 114 may provide instructions and/or data to the processor 112. The processor 112 may perform operations based on the instructions stored within the memory 114. The instructions may be executable to implement the methods described herein. The STA 110 may be coupled to one or more external storage devices, such as a portable memory storage device 180.

The STA 110 may include a transceiver 118 configured for transmission of and reception of data with respect to the STA 110 and the M2M device 120, the access point 140, or both. The transceiver 118 may include a combination of a transmitter and a receiver. The STA 110 may include an antenna 108. The antenna 108 may be electrically coupled to the transceiver 118.

An access point, such as the AP 140, may include, be implemented as, or known as a NodeB, Radio Network Controller ("RNC"), an eNodeB, a Base Station Controller ("BSC"), a Base Transceiver Station ("BTS"), a Base Station ("BS"), Transceiver Function ("TF"), a Router, a Transceiver, a Hub, or another device. The AP 140 may serve as a hub or base station for communications within the communication system including communications with the STA 110 or the M2M device 120, communications between the STA 110 and the M2M device 120, and communications between the STA 110 and the M2M manufacturer 150.

Although one M2M device 120 is shown, the communication system 100 may include one or more M2M devices. The one or more M2M devices may include household appliances (e.g., a refrigerator), consumer electronic devices (e.g., a television), networking devices (e.g., an access point).

The M2M device 120 may include a processor 122 and a memory 132. The memory 132 may provide instructions and/or data to the processor 122. The processor 122 may include one or more processors that may control operation of the M2M device 120. The processor 122 may perform operations based on the instructions stored within the memory 132. The instructions may be executable by the processor 122 to implement/perform the methods described herein.

The memory 132 may include switching logic 124, security logic 126, station (STA) logic 128, and access point (AP) logic 130, each including instructions executable by the processor 122. The memory 132 may include (e.g., store) AP connectivity information 134, a M2M device ID 136, and security credentials 138.

The AP connectivity information 134 may enable the M2M device 120 to associate with a particular AP, such as the AP 140. The M2M device ID 136 may include an identification code or a serial number that uniquely identifies the M2M device 120. The security credentials 138 may include security information that enables one or more devices to connect to the M2M device 120 when the M2M device 120 operates as the AP or to enable the M2M device 120 to connect to the one or more devices when the M2M device 120 operates as the STA.

The M2M device 120 may include a transceiver 146 configured for transmission of and reception of data with respect to the M2M device 120 and the AP 140, the STA 110, or both. The transceiver 146 may include a combination of a transmitter and a receiver. The M2M device 120 may include an antenna 142. The antenna 142 may be electrically coupled to the transceiver 146 and may support communication performed by the transceiver 146. A communication link between the M2M device 120 and the one or more other devices may include bi-directional communication or uni-directional communication from the perspective of the M2M device 120.

The M2M device 120 may include sensor applications and/or control applications to be used in various settings (e.g., environments), such as building automation, healthcare monitoring, smart metering, smart grid networks, surveillance systems, Internet connectivity range extension, or machine-to-machine communication.

The M2M manufacturer 150 may provide device information (e.g., M2M device information 154) for one or more M2M devices. The M2M manufacturer 150 may store the M2M device information 154 for one or more M2M devices. The M2M manufacturer 150 may be communicatively coupled to the STA 110. The M2M manufacturer 150 may be coupled to the portable memory storage device 180. In a particular embodiment, the M2M manufacturer 150 may provide the portable memory storage device 180. The M2M manufacturer 150 may be associated with a server. The M2M manufacturer 150 may provide device information for one or more M2M devices to the STA 110 directly or may store information in the portable memory storage device 180.

A variety of processes and methods may be used for transmissions by the communication system 100. The communications within the communication system may be sent via a wireless connection, a wired connection, or both. The wired connection may include an Ethernet connection, an optical connection, a cable connection, a telephone connection, a power line connection, a facsimile connection, or a combination thereof. The wireless connection may operate according to one or more of wireless communication compliant standards including code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, Institute of Electrical and Electronics Engineers (IEEE) 802.11x (e.g., IEEE 802.11ah), or a combination thereof.

During operation, the M2M device 120 may operate in a variety of programming modes. The programming modes may be performed by one or more of the switching logic 124, the security logic 126, the STA logic 128, and the AP logic 130.

When the M2M device operates based on the switching logic 124, the M2M device 120 may be configured to change a mode of operation of the M2M device 120 from operating using the STA logic 128 to operating using the AP logic 130, and vice versa. In a particular embodiment, the switching logic 124 may select a first mode of operation, a second mode of operation, or a combination thereof. The switching logic 124 may be configured to initialize (e.g., default) the M2M device 120 to a particular mode of operation upon a power-up (e.g., turning on the M2M device 120 from an off state). In a particular implementation, the switching logic 124 may be configured to change the mode of operation to a third mode of operation corresponding to a Wi-Fi direct mode.

In a particular mode, when the M2M device 120 operates based on the security logic 126, and the M2M device 120 may be configured to control which STAs (e.g., the STA 110) and/or which APs (e.g., the AP 140) the M2M device 120 communicates with and/or connects to. For example, the M2M device 120 may use a public key or private key (e.g., a certificate), a password, a table of authorized devices, or a combination thereof. The M2M device 120 may include information to generate a public key or private key. The table of authorized devices may identify particular devices and/or one or more device characteristics with which the M2M device 120 communicates. The device characteristics may include a device type (e.g., a phone, a smart meter, a power line equipment, a power line recloser, etc.), a device capability (e.g., multimedia capable, printing service), a service carrier, a media access control (MAC) address, an internet protocol (IP) address, a mobile equipment identifier (MEID), a service set identifier (SSID), a subscriber identifier, a device owner (e.g., a utility company), or a combination thereof.

In another particular mode, when the M2M device 120 operates based on the STA logic 128, the M2M device 120 may be enabled to operate (e.g., function) as a station (STA). Operating as the STA may include discovering one or more other devices (e.g., the STA 110 or the AP 140) and establishing a communication link (e.g., a wireless communication link) between the M2M device 120 and the one or more other devices.

In another particular mode, when the M2M device 120 operates based on the AP logic 130, the M2M device 120 may be configured to provide (e.g., support) a wireless local area network. In the programming mode, the M2M device 120 may be programmed to establish a connection with another device, such as the AP 140. The AP logic 130 may enable the M2M device 120 to operate (e.g., function) as an AP. Operating as an AP may enable the M2M device 120 to be discoverable (e.g., appear) to one or more other devices as an access point.

The AP logic 130 may be configured to provide one or more radio access services, such as 3G access service, cellular access service, bluetooth radio access services, or any combination thereof. In a particular embodiment, the M2M device 120 may provide a beacon that is detectable by the one or more other devices. The beacon may include an identification code, a M2M device identification (ID), a service set identifier (SSID) associated with the M2M device 120, or a combination thereof. In a particular embodiment, the AP logic 130 may enable the M2M device 120 to operate in a Wi-Fi direct mode rather than as the AP. When operating in the Wi-Fi direct mode, the M2M device 120 may communicate with the one or more other devices according to one or more Wi-Fi direct standards.

In an illustrative embodiment, the M2M device 120 may be remotely configured by the STA 110 to enable the M2M device 120 to establish a communication link with the AP 140. The M2M device 120 may broadcast a message (e.g., a beacon) that includes information, such as the M2M device ID (e.g., the M2M device ID 136) associated with the M2M device 120. The message may also include a SSID associated with the M2M device 120.

The STA 110 may detect the M2M device 120 and after detecting the M2M device 120, the STA 110 may extract the M2M device ID (and/or other information) included in the message. The information included in the message may enable the STA 110 to obtain access data. The access data may be used later to establish a communication link with the M2M device 120.

The STA 110 may communicate with the M2M manufacturer 150 to obtain information, which may be used to establish a communication link between the STA 110 and the M2M device 120. The M2M manufacturer 150 may authenticate the STA 110 based on information provided by the STA 110, such as the M2M device ID of the M2M device 120, the SSID associated with the M2M device 120, a serial number of the M2M device 120, a proof of purchase identifier associated with the M2M device 120, or a combination thereof.

After authenticating the STA 110, the M2M manufacturer 150 may send to the STA 110 information including access data, such as security credentials (e.g., the security credentials 138), for establishing a communication link with the M2M device 120. The security credentials may include a certificate associated with the M2M device 120, a public key or private key associated with the M2M device 120, a user name and password for accessing the M2M device 120, or a combination thereof. Alternatively, the M2M manufacturer 150 may store the information (e.g., the security credentials) in the portable memory storage device 180, where the STA 110 may access the information on completion of the request.

To establish the communication link between the STA 110 and the M2M device 120, the STA 110 may request authentication from the M2M device 120. The access data received from the M2M manufacturer 150 may include one or more instructions associated with an authentication procedure to enable the STA 110 to establish a communication link with the M2M device 120.

When operating based on the AP logic 130, the M2M device 120 may establish trust with one or more other devices (e.g., the STA 110) by operating in accordance with AP capabilities including a low power transmission mode, single device connectivity support, certificate based authentication, and or a combination thereof. In order for another device to connect to (e.g., associate with) the M2M device 120, the M2M device 120 may perform an authentication procedure (e.g., a handshake procedure) in which the M2M device 120 authenticates the other device (e.g., the STA 110). The M2M device 120 may verify one or more security credentials (e.g., a password, a certificate, a private key or public key, etc.) provided by the other device as part of the authentication procedure.

To authenticate the STA 110, the M2M device 120 may operate based on the security logic 126 to determine whether a device attempting to associate with the M2M device 120 has provided sufficient security information. The M2M device 120 may receive the security information from the STA 110. For the authentication, the STA 110 may provide at least a portion of the access data, such as the security information (e.g., security credentials), received from the M2M manufacturer 150, to the M2M device 120. The STA 110 may transmit a portion of the access data necessary to receive authentication. The security logic 126 may compare the security information provided by a device, such as the STA 110, to security credentials 138 stored in the memory of the M2M device 120. Alternatively, when the M2M device 120 is operating based on the STA logic, the security logic 126 may determine whether the M2M device 120 includes the security credentials 138 and/or security credentials associated with a device with which the M2M device 120 is attempting to connect.

After the M2M device 120 authenticates the STA 110, a communication link may be established between the M2M device 120 and the STA 110. The M2M device 120 and the STA 110 may communicate data with each other via the communication link. The communication link may be a secure link that protects data exchange with integrity and confidentiality.

After the communication link between the M2M device 120 and the STA 110 is established, the M2M device 120 may establish a communication link with one or more wireless devices, such as the AP 140. Based on the information the M2M device 120 receives from the STA 110 during authentication, the M2M device 120 may determine the AP connectivity information 134 provided by the STA 110 to establish a communication link with the AP 140. The AP connectivity information 134 may include information to establish a communication link with the AP 140, such as an SSID, a password, security information, authentication credentials, other access credentials, or a combination thereof, associated with the AP 140. The M2M device 120 may store the AP connectivity information 134 in the memory (e.g., the memory 132) of the M2M device 120. Accordingly, the M2M device 120 may be considered "configured" or "programmed" to establish a communication link with the AP 140 after the AP connectivity information 134 associated with the AP 140 has been stored.

After the M2M device 120 is configured to establish the communication link with the AP 140 (e.g., receives the AP connectivity information 134), the M2M device 120 may enter (e.g., activate) a normal mode of operation, at 245.

To establish the communication link between the M2M device 120 and the AP 140, the M2M device 120 may initiate an authentication procedure with the AP 140 by requesting authentication from the AP 140. During the authentication procedure, the M2M device 120 may provide to the AP 140 at least a portion of the AP connectivity information 134 received from the STA 110. After the AP 140 authenticates the M2M device 120, the communication link may be established between the AP 140 and the M2M device 120. After the communication between the M2M device 120 and the AP 140 is established, the M2M device 120 may transmit data to the AP 140 via the communication link, at 255.

Thus, the communication system 100 illustrates how a M2M device, which may not otherwise be able to access a wireless network due to limited access to connectivity information, can be configured to access the wireless network via a station within communicative distance of the M2M device. Configuring the M2M device via a station (e.g., the STA 110) to provide access to a wireless network may enable the station to verify identity information from a manufacturer (e.g., the M2M manufacturer 150) to verify that that the M2M device is authorized. For an M2M device that has a limited communication range, access to a local device (e.g., the STA 110) can provide the M2M device with connectivity information such that time spent configuring the M2M device to access a wireless network may be reduced.

Figure 2:
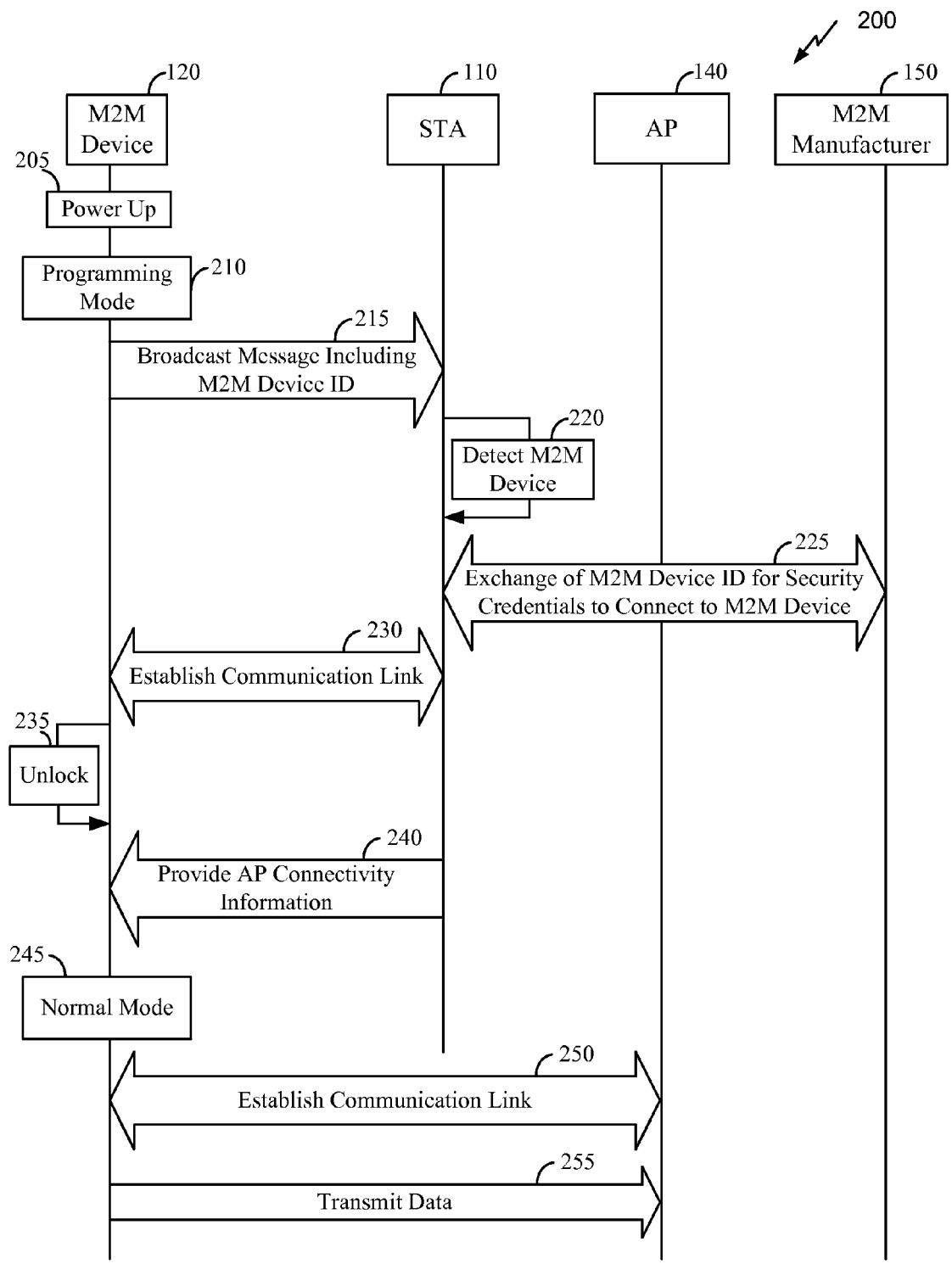
FIG. 2 is a ladder diagram to illustrate an exemplary process of programming a device to establish a communication link with another device.

FIG. 2 illustrates a diagram of a process 200 of programming an M2M device to establish a communication link with another device. The process 200 is illustrated with certain elements of the communication system 100 described with respect to FIG. 1. For example, the process 200 illustrates programming the M2M device 120 to establish a communication link with the AP 140.

At 205, the M2M device 120 may power up (e.g., turn on by changing to an on state from an off state). At 210, the M2M device 120 may enter a particular programming mode. In a particular embodiment, the M2M device 120, after powering up, may default into a programming mode in which the M2M device 120 operates based on the AP logic 130. For example, the M2M device 120 may operate as a low power AP having a relatively small range of transmission. In another embodiment, the M2M device 120, when operating in the programming mode, may operate in accordance with a Wi-Fi Direct standard. When operating in the programming mode, the M2M device 120 may be configured to provide (e.g., support) a wireless local area network. In the programming mode, the M2M device 120 may be programmed to establish a connection with another device, such as the STA 110.

At 215, the M2M device 120 may broadcast a message (e.g., a beacon) that includes the M2M device ID (e.g., the M2M device ID 136) associated with the M2M device 120. The message may also include a SSID associated with the M2M device 120. The STA 110 may detect the M2M device 120, at 220. After detecting the M2M device 120, the STA 110 may extract the M2M device ID (and/or other information) included in the message.

The STA 110 may communicate with the M2M manufacturer 150 to obtain information to establish a communication link between the STA 110 and the M2M device 120, at 225. The M2M manufacturer 150 may authenticate the STA 110 based on information provided by the STA 110, such as the M2M device ID of the M2M device 120, the SSID associated with the M2M device 120, a serial number of the M2M device 120, a proof of purchase identifier associated with the M2M device 120, or a combination thereof.

After authenticating the STA 110, the M2M manufacturer 150 may send to the STA 110 information, such as security credentials (e.g., the security credentials 138), for establishing the communication link with the M2M device 120. The security credentials may include a certificate associated with the M2M device 120, a public key or private key associated with the M2M device 120, a user name and password for accessing the M2M device 120, or a combination thereof.

At 230, the communication link between the STA 110 and the M2M device 120 may be established. Establishing the communication link between the STA 110 and the M2M device 120 may include the STA 110 requesting authentication from the M2M device 120. For the authentication, the STA 110 may provide the information, such as the security credentials, received from the M2M manufacturer 150 to the M2M device 120. The M2M device 120 may grant authentication to the STA 110 based on verification of the security information provided by the STA 110.

After the M2M device 120 authenticates the STA 110, the communication link may be established between the M2M device 120 and the STA 110. The M2M device 120 and the STA 110 may communicate data with each other via the communication link. The communication link may be a secure link that protects data exchange with integrity and confidentiality.

After the communication link between the M2M device 120 and the STA 110 is established, the M2M device 120 may unlock (e.g., write enable) a portion of a memory of the M2M device 120, at 235. The portion of the memory that is unlocked may correspond to storage associated with AP connectivity information (e.g., the AP connectivity info 134). The AP connectivity information may be used by the M2M device 120 to establish a communication link with one or more wireless devices, such as the AP 140, the STA 110, or both. The M2M device 120 may unlock the portion of the memory based in part on the information (e.g., the security credentials) received from the STA 110 during the authentication procedure.

The STA 110 may provide the M2M device 120 with the AP connectivity information, at 240. The AP connectivity information may include information to establish a communication link with the AP 140, such as an SSID, a password, security information, authentication credentials, other access credentials, or a combination thereof, associated with the AP 140. A grant of authentication enables the STA 110 to program the M2M device 120. In other words, the AP connectivity information may be stored by the M2M device 120 when the STA 110 is authorized (e.g., has been grant authentication). As such, the M2M device 120 may store the AP connectivity information received from the STA 110 in the memory (e.g., the memory 132) of the M2M device 120. Accordingly, the M2M device 120 may be considered "programmed" to establish the communication link with the AP 140 after the AP connectivity information associated with the AP 140 has been stored.

After the M2M device 120 is configured to establish the communication link with the AP 140 (e.g., receives the AP connectivity information), the M2M device 120 may enter (e.g., activate) a normal mode of operation, at 245.

The communication link between the M2M device 120 and the AP 140 may be established, at 250. For example, the M2M device 120 may initiate an authentication procedure with the AP 140 by requesting authentication from the AP 140. During the authentication procedure, the M2M device 120 may provide to the AP 140 at least a portion of the AP connectivity information received from the STA 110. After the AP 140 authenticates the M2M device 120, the communication link may be established between the AP 140 and the M2M device 120. The communication link may include an internet protocol (IP) link.

After the communication link between the M2M device 120 and the AP 140 is established, the M2M device 120 may transmit data to the AP 140 via the communication link, at 255. The M2M device 120 may transmit a second message, data, or both to the STA 110 via AP 140 when the communication link between the M2M device 120 and the AP 140 has been established.

Figure 3A:
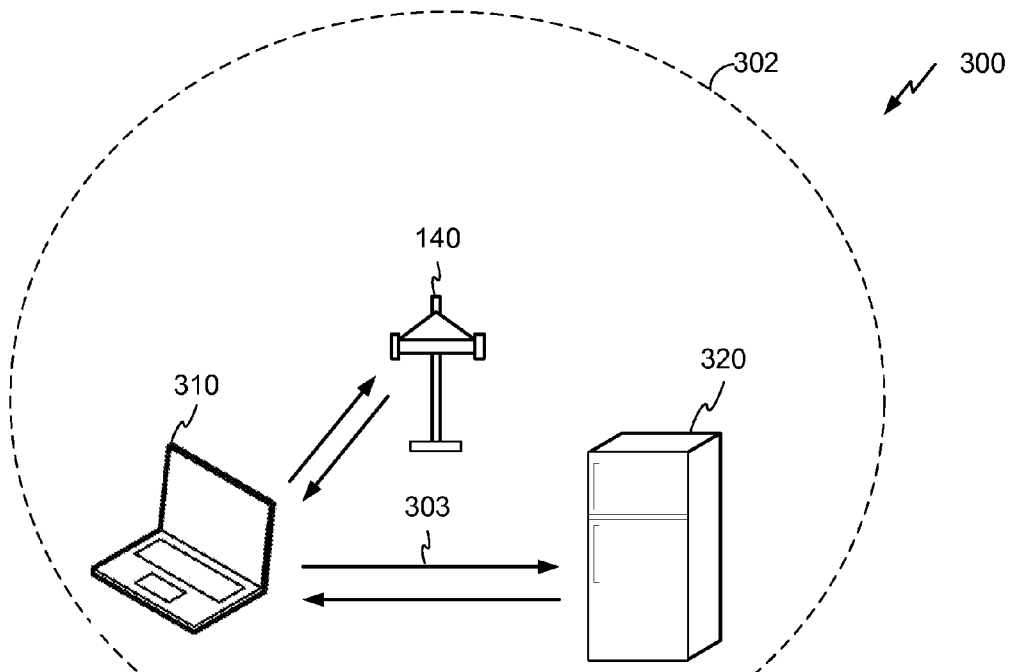
FIGS. 3A and 3B are diagrams illustrating an exemplary communication system.
Figure 3B:
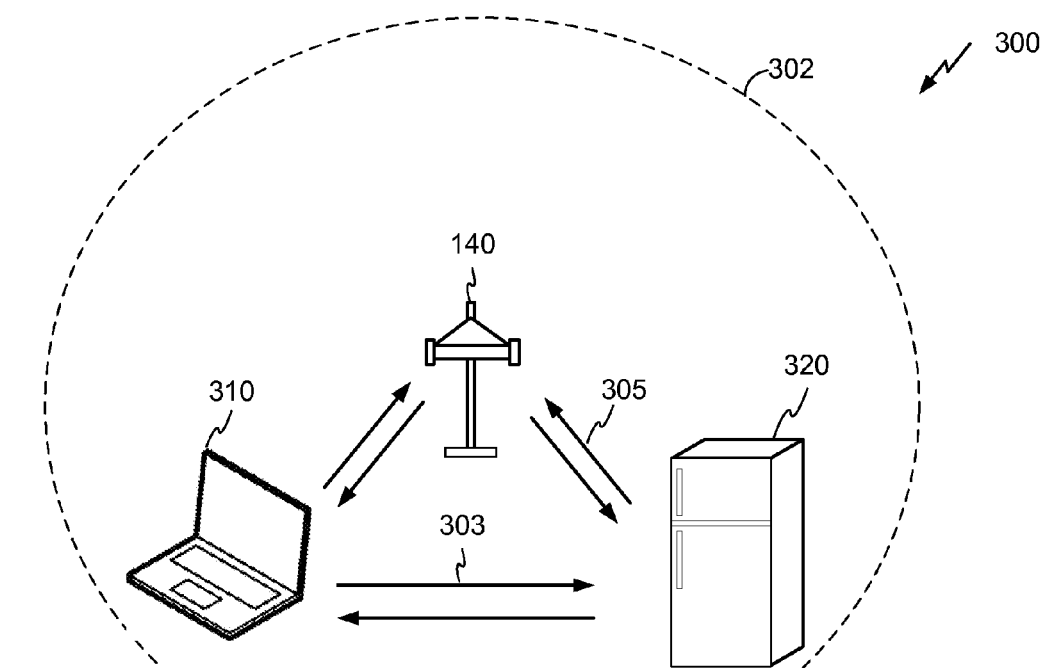

FIGS. 3A and 3B are diagrams illustrating an exemplary communication system 300. The communication system 300 is illustrated with certain elements of the communication system 100 described with respect to FIG. 1.

The communication system 300 in FIG. 3A includes the AP 140. The AP 140 may provide a communication service within a basic service area (BSA) 302. The communication system 300 may include one or more communication devices such as a computer 310 and an M2M refrigerator 320. The computer 310 may correspond to the STA 110. The M2M refrigerator 320 may be a machine-to-machine capable device. The M2M refrigerator 320 may correspond to and is an example of the M2M device 120. The communication system 300 may include other communication devices, which may support machine-to-machine communications.

In a particular embodiment, the M2M refrigerator 320 may be unable to directly establish a communication link with the AP 140. This may be the case, for example, at the time when the M2M refrigerator 320 is introduced to the BSA 302. For example, the M2M refrigerator 320 may not include security information for authentication to establish a communication link with the AP 140. Thus, the M2M refrigerator 320 may not be able to communicate with the computer 310 via the AP 140. However, the M2M refrigerator 320 may include AP logic (e.g., the AP logic 130) that enables the M2M refrigerator 320 to operate and appear as an AP to STAs, such as the computer 310. Accordingly, the M2M refrigerator 320 can appear as an AP to the computer 310 using the AP logic included in the M2M refrigerator 320. A communication link 303 may be established between the computer 310 and the M2M refrigerator 320. Once the communication link 303 is established, the computer 310 can communicate with the M2M refrigerator 320 via the communication link 303.

The communication system 300 in FIG. 3B illustrates the communication system 300 in FIG. 3A after the communication link 303 has been established. Once the communication link 303 has been established, the computer 310 may serve as a programming device that may provide information to the M2M refrigerator 320 that enables the M2M refrigerator 320 to establish a communication link 305 between the M2M refrigerator 320 and the AP 140. The information may include AP connectivity information that may include an SSID, a password, security information, authentication credentials, other access credentials, or a combination thereof, associated with the AP 140.

Once the M2M refrigerator 320 has the information for establishing the communication link 305 with the AP 140, the M2M refrigerator 320 can establish the link 305 and communicate with the AP 140 over the communication link 305. Once communication link 305 has been established, the communication link 303 may be terminated.

Figure 4:
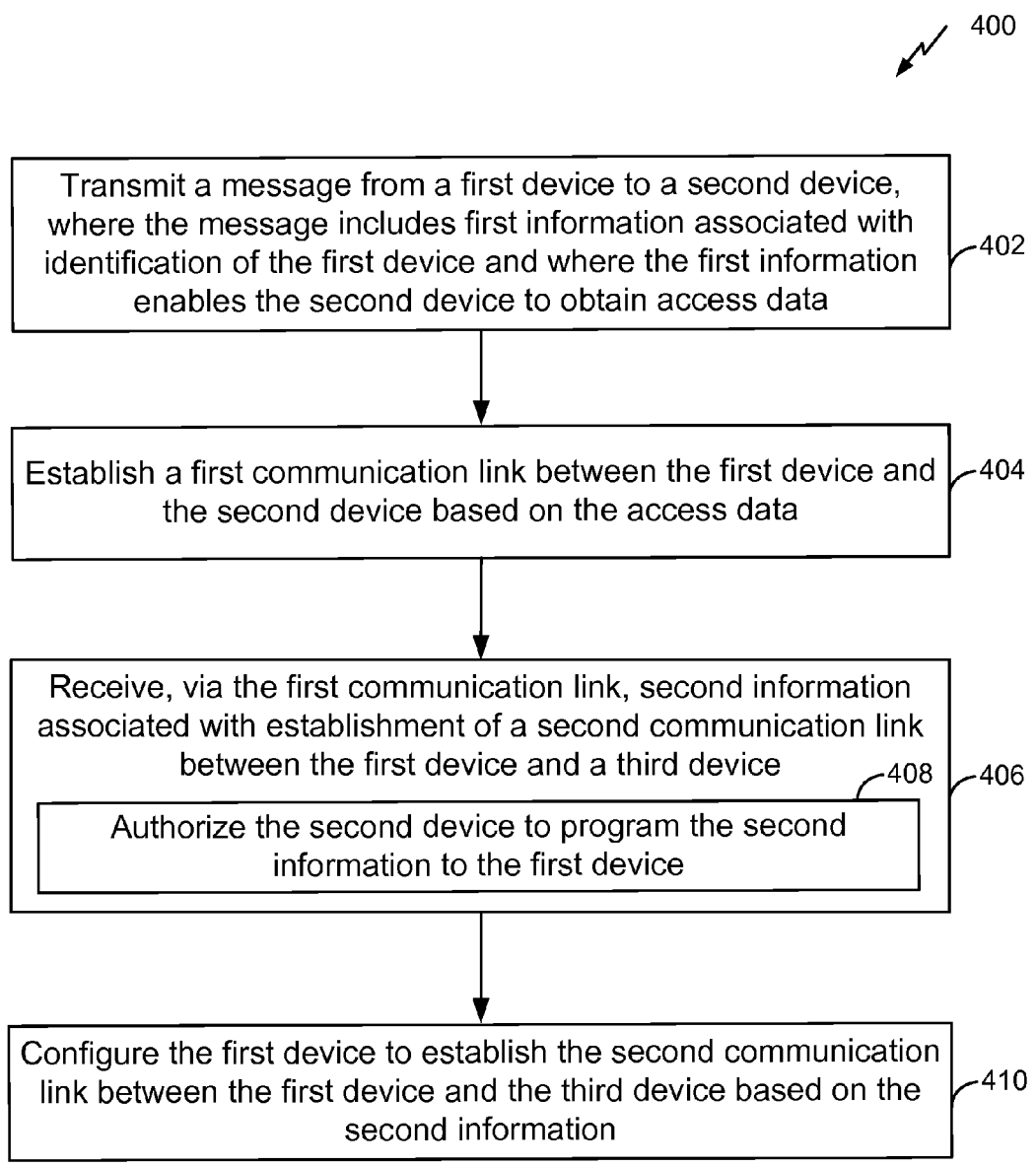
FIG. 4 is a flow diagram to illustrate an exemplary method of configuring a device to establish a communication link with another device.

FIG. 4 shows a flow diagram that illustrates an exemplary method 400 of configuring a device to establish a communication link with another device. For example, the method 400 may be used to configure the M2M device 120 of FIG. 1 to establish a communication link with the AP 140 of FIG. 1. The method 400 may be performed by the M2M device 120 of FIG. 1 or the M2M refrigerator 320 of FIGS. 3A and 3B.

At 402, the method 400 includes transmitting a message from a first device to a second device. The message may include first information associated with identification of the first device. For example, the M2M device 120 of FIG. 1 (e.g., a first device) may transmit a message (e.g., a beacon) to the STA 110 (e.g., a second device). The first information associated with identification of the first device may include a device ID (e.g., the M2M device ID 136) associated with the first device. The message may also include a SSID associated with the first device. The first information may enable the second device to obtain access data. For example, the second device may obtain access data that includes security information (e.g., security credentials) such as include a certificate associated with the first device, a public key or private key associated with the first device, a user name and password for accessing the first device, or a combination thereof.

At 404, the method 400 may include establishing a first communication link between the first device and the second device based on the access data. For example, the M2M device 120 of FIG. 1 may establish a first communication link with the STA 110 based on the access data. To establish the first communication link, the first device may receive the access data (e.g., the security information) from the second device. The first device may authenticate the second device based on the access data.

At 406, the method 400 may include receiving, via the first communication link, second information associated with establishment of a second communication link between the first device and a third device. For example, the M2M device 120 of FIG. 1 (e.g., the first device) may receive, via the first communication link, second information associated with establishment of a second communication link between the M2M device 120 and the AP 140 (e.g., the third device). The second information may include AP connectivity information. The AP connectivity information may include information to establish a communication link with the third device, such as an SSID, a password, security information, authentication credentials, other access credentials, or a combination thereof, associated with the third device.

At 408, receiving the second information may include authorizing the second device to program the second information to the first device. For example, the M2M device 120 of FIG. 1 may authorize the STA 110 to program the second information to the first device. The first device may authenticate the second device to program the second information based on verification of security information received from the second device. The security information may be received from the second device via the first communication link. The security information may include a certificate associated with the first device, a public key or private key associated with the first device, a user name and password for accessing the first device, or a combination thereof.

At 410, the method 400 may include configuring the first device to establish the second communication link between the first device and the third device based on the second information. For example, the M2M device 120 of FIG. 1 may be configured to establish the second communication link between the M2M device 120 and the AP 140 based on the second information. Configuring the first device may include programming the first device according to instructions for communication with the third device.

Figure 5:
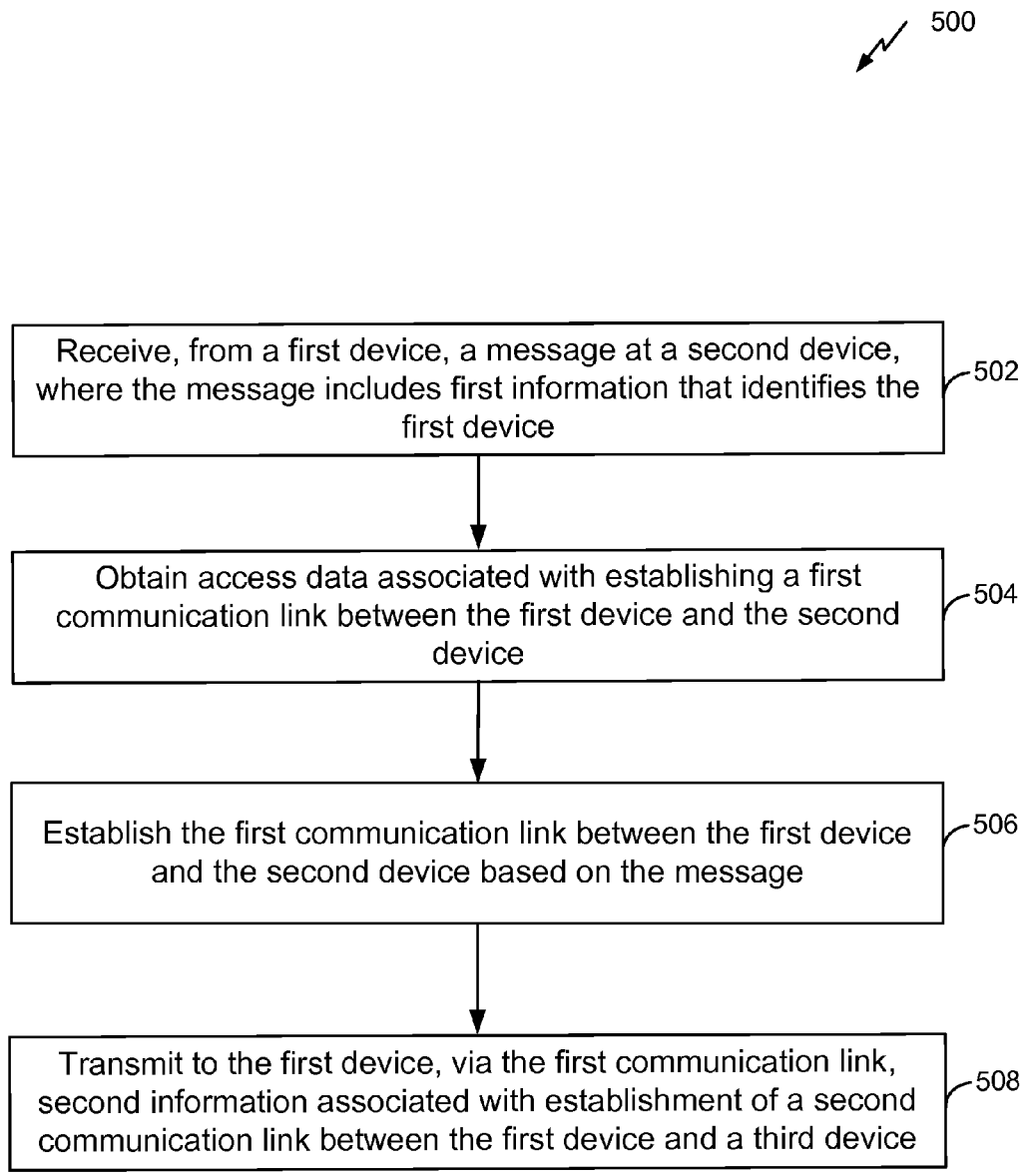
FIG. 5 is a flow diagram to illustrate an exemplary method of configuring a device to establish a communication link with another device.

FIG. 5 shows a flow diagram of an exemplary method 500 of configuring a device to establish a communication link with another device. For example, the method 500 may be used to configure the M2M device 120 of FIG. 1 to establish a communication link with the AP 140 of FIG. 1. The method 500 may be performed by the STA 110 of FIG. 1 or the computer 310 of FIG. 3.

At 502, the method 500 includes receiving, from a first device, a message at a second device. The message may include first information that identifies the first device. For example, the STA 110 of FIG. 1 (e.g., a second device) may receive a message (e.g., a beacon) from the M2M device 120 (e.g., a first device). The first information may include a device ID (e.g., the M2M device ID 136) associated with the first device. The message may also include a SSID associated with the first device. The first information may enable the second device to obtain access data. For example, the second device may obtain access data that includes security information (e.g., security credentials) that include a certificate associated with the first device, a public key or private key associated with the first device, a user name and password for accessing the first device, or a combination thereof.

At 504, the method 500 includes obtaining access data associated with establishing a first communication link between the first device and the second device. For example, the STA 110 of FIG. 1 may obtain access data associated establishing a first communication link between the first device and the second device. The access data may include security information (e.g., security credentials) that includes a certificate associated with the first device, a public key or private key associated with the first device, a user name and password for accessing the first device, or a combination thereof.

In a particular embodiment, obtaining the access data may include receiving the access data associated with the first device from a fourth device associated with a manufacturer of the first device. For example, the STA 110 may receive the access data associated with the M2M device 120 from the M2M manufacturer 150 (e.g., a fourth device).

At 506, the method 500 includes establishing the first communication link between the first device and the second device based on the message. For example, the STA 110 of FIG. 1 may establish the first communication link between the M2M device 120 and the STA 110 based on the message.

In a particular embodiment, the second device may establish the first communication link between the first device and the second device further based on receiving the access data associated with the first device from the fourth device associated with a manufacturer of the first device. For example, the STA 110 may establish the first communication link between the M2M device 120 and the STA 110 based on receiving access data associated with the M2M device 120 from the M2M manufacturer 150. The access data may include security information (e.g., security credentials) that include a certificate associated with the first device, a public key or private key associated with the first device, a user name and password for accessing the first device, or a combination thereof.

At 508, the method 500 includes transmitting to the first device, via the first communication link, second information associated with establishment of a second communication link between the first device and a third device. For example, the STA 110 of FIG. 1 (e.g., the second device) may transmit to the M2M device 120 (e.g., the first device), via the first communication link, second information associated with establishment of a second communication link between the M2M device 120 and the AP 140 (e.g., the third device). The second information may include AP connectivity information. The AP connectivity information may include information to establish a communication link with the third device, such as an SSID, a password, security information, authentication credentials, other access credentials, or a combination thereof, associated with the third device.

Figure 6:
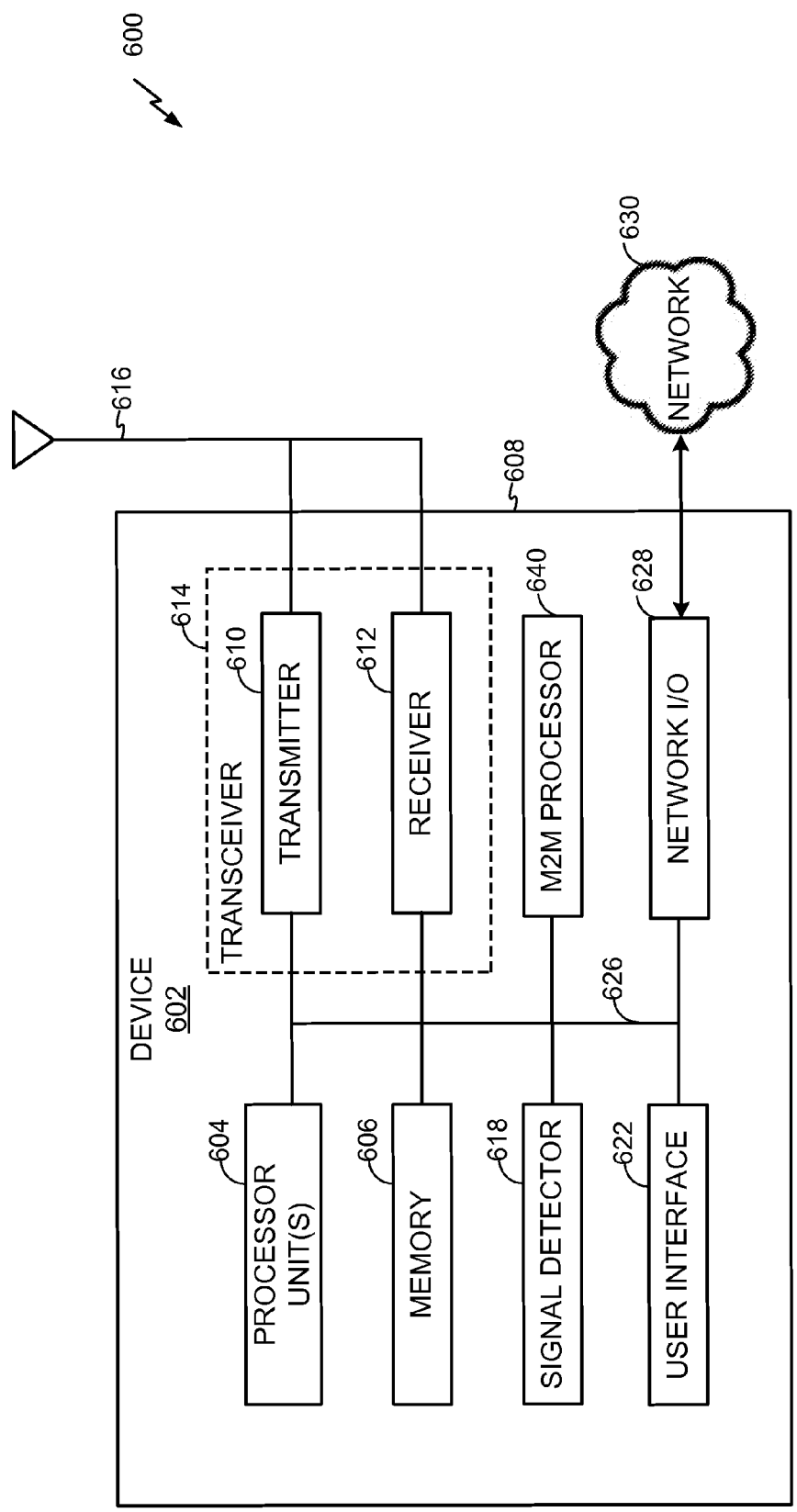
FIG. 6 is a diagram to illustrate an exemplary device that may be employed within the communication system of FIG. 1.

FIG. 6 is a diagram 600 to illustrate an exemplary device that may be employed within the communication system 100 of FIG. 1. A wireless device 602 is an example of a device that may be configured to implement at least portions of the various methods, such as the process 200 of FIG. 2, the method 400 of FIG. 4, the method 500 of FIG. 5, or a combination thereof.

The device 602 may include various components, such one or more processor units 604, a memory 606, a signal detector 618, a user interface 622, a transceiver 614, a housing 608, and a M2M processor 640. The transceiver 614 may include a transmitter 610 and a receiver 612, or a combination thereof. The various components of the device 602 may be coupled together via a bus system 626. The bus system 626 may include a power bus, a control signal bus, a status signal bus, a data bus, or a combination thereof. Those of skill in the art will appreciate the components of the device 602 may be coupled together or accept or provide inputs to each other using a mechanism other than the bus system 626. The device 602 may include a network input/output (I/O) interface 628. The network I/O interface 628 may be configured to be coupled to a network, such as a network 630.

The one or more processor units 604 may control operation of the device 602. The one or more processor units 604 may also be referred to as a central processing unit (CPU). The memory 606, which may include read-only memory (ROM), random access memory (RAM), or a combination thereof, may provide instructions and/or data to the one or more processor units 604. A portion of the memory 606 may also include non-volatile random access memory (NVRAM). The processor units 604 may perform logical and arithmetic operations based on program instructions stored within the memory 606 or another memory (not shown) external to the device 602. The instructions in the memory 606 may be executable to implement the methods described herein, such as at least portions of the process 200 of FIG. 2, the method 400 of FIG. 4, or the method 500 of FIG. 5. Further, the memory 606 may include (e.g., store) software that is executable by either of the processor units 604 and/or the M2M processor 640. In a particular embodiment, the one or more processor units 604 and the M2M processor 640 may be included in a single processor configured to perform one or more functions of each of the processor units 604 and the M2M processor 640. In a particular embodiment, the device 602 is implemented such that the one or more processor units 604 are configured to utilize the M2M processor 640.

The one or more processor units 604 may be implemented as a general-purpose microprocessor, a microcontroller, a digital signal processor (DSP), a field programmable gate array (FPGA), a programmable logic devices (PLD), a controller, a state machine, gated logic, discrete hardware components, dedicated hardware finite state machines, any other suitable entities that can perform calculations or other manipulations of information, or a combination thereof. In a particular embodiment, the one or more processor units 604 include a DSP that is configured to generate a packet (e.g., a data packet) for transmission. For example, the packet may include a physical layer data unit (PPDU).

The transmitter 610 and the receiver 612 may enable transmission and reception of data between the device 602 and a remote location. The transmitter 610 and the receiver 612 may be combined into the transceiver 614. An antenna 616 may be attached to the housing 608. The antenna 616 may be electrically coupled to the transceiver 614. The wireless device 602 may also include (not shown) multiple transmitters, multiple receivers, and/or multiple transceivers. In a particular embodiment, the transceiver 614 may be included in a wireless interface (not shown) that is coupled to the processor units 604 and/or the M2M processor 640. The transmitter 610 may be configured to wirelessly transmit packets and/or signals. For example, the transmitter 610 may be configured to transmit different types of packets generated by the processor units 604 or the M2M processor 640. The packets may be made available to the transmitter 610. For example, the M2M processor 640 may store a packet in the memory 606 and the transmitter 610 may be configured to retrieve the packet. The transmitter 610 may wirelessly transmit the packet via the antenna 616. In a particular embodiment, the transmitter 610 buffers or queues the packet/signals prior to transmission.

The antenna 616 of the device 602 detects transmitted packets (e.g., signals) from other devices. The receiver 612 may be configured to process the detected packets and make the detected packets available to the processor units 604 or the M2M processor 640. For example, the receiver 612 may store the packet in memory 606 and the M2M processor 640 may be configured to retrieve the packets for further processing.

The signal detector 618 may be used to detect and quantify a level of signals received via the transceiver 614. For example, the signal detector 618 may detect a total energy, an energy per subcarrier per symbol, a power spectral density, and other signals.

The device 602 may also include the user interface 622. The user interface 622 may include a keypad, a microphone, a speaker, a display, or a combination thereof. The user interface 622 may include any element or component that conveys information to a user (e.g., an operator) of the device 602 and/or receives input from the user. The housing 608 may surround one or more of the components included in the device 602.

Figure 7:
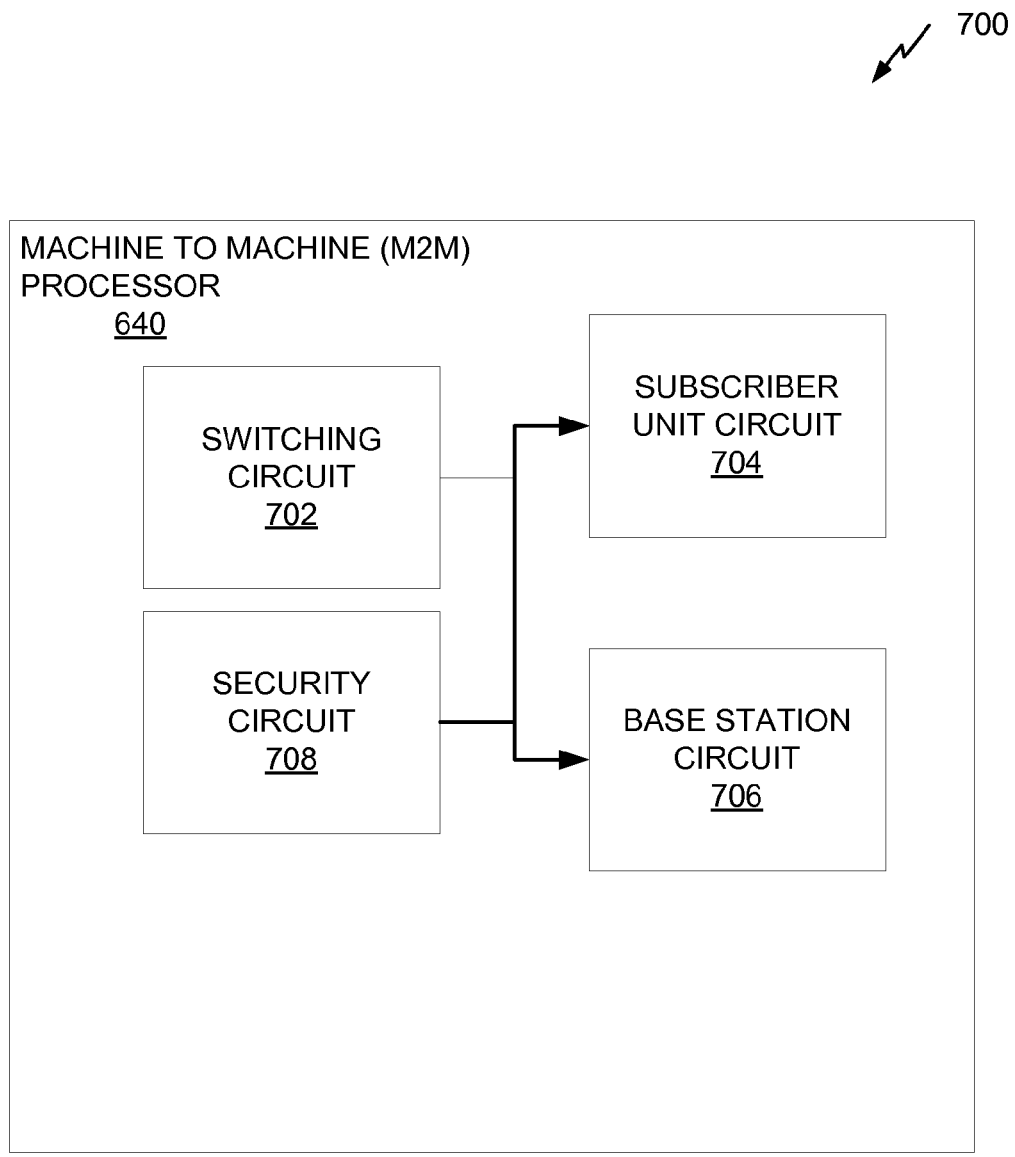
FIG. 7 is a diagram to illustrate an exemplary machine-to-machine processor that may be employed within the device of FIG. 6.

FIG. 7 shows a functional block diagram 700 of an exemplary machine-to-machine processor (e.g., the M2M processor 640 of FIG. 6) that may be employed with the device 602 of FIG. 6. The block diagram 700 may be described with reference to elements of FIG. 1 and FIG. 6.

The M2M processor 640 of FIG. 6 may include a subscriber unit circuit 704. The subscriber unit circuit 704 may be configured to communicate bi-directionally with an AP, such as the AP 140 of FIG. 1. The M2M processor 640 of FIG. 6 may include a base station circuit 706. The base station circuit 706 may be configured to allow the device 602 of FIG. 6 to operate and appear to STAs (e.g., the STA 110 of FIG. 1) as an AP. The base station circuit 706 may effectuate bi-directional communications with subscriber unit circuits 704 of M2M processors (e.g., the M2M processor 640 of FIG. 6) of other devices. A STA (e.g., the STA 110 of FIG. 1) communicating with device 602 of FIG. 6 having an active base station circuit 706 may not know whether the communication is with a "true" AP (e.g., the AP 140 of FIG. 1) or the device 602 (e.g., the M2M device 120 of FIG. 1) operating as an AP. The same protocols, encryption, service parameters, etc. may be utilized for communications between the device 602 and the STA.

The base station circuit 706 may be configured to provide one or more radio access services. For example, the base station circuit may simultaneously or separately provide 3G, cellular, and bluetooth radio access services. The radio access services provided by the base station circuit 706 may be statically defined. In some implementations, signals may be transmitted to the device 602 of FIG. 6 to dynamically configure the base station circuit 706.

The M2M processor 640 of FIG. 6 may include a security circuit 708. The security circuit 708 may be configured to control which STAs and/or which APs the device 602 of FIG. 6 can communicate with. In some implementations, it may be desirable to only allow authorized devices to connect to the communication system 100 of FIG. 1. For example, the security circuit 708 may consult a table of authorized devices to determine allowed communication partners. The table may be updated for the communication system, for example by the AP 140 of FIG. 1. The table may be created by the M2M processor 640 of FIG. 6 by listening for signals from other authorized devices in proximity thereto. The authorization information may be stored in the memory 606. In some implementations, the security circuit 708 may be use other means to determine which devices are authorized to communicate, such as calculation, external authentication services, or the like.

In some implementations, a STA or an AP may be identified as authorized by some electronically represented characteristic. For example, the characteristic may indicate the device type (e.g., phone, smart meter, power line equipment, power line recloser), device capability (e.g., multimedia capable, printing service) service carrier, media access control (MAC) address, IP addresses, mobile equipment identifier (MEID), service set identifier (SSID), subscriber identifier, device owner (e.g., a utility company). In some implementations, the M2M processor 640 of FIG. 6 may register the device 602 as an authorized AP with the communication system 100 such that the device 602 is discoverable and compatible within the communication system 100.

The M2M processor 640 may include a switching circuit 702. In some implementations, the switching circuit 702 may be configured to alternatively activate the base station circuit 706 and the subscriber unit circuit 704. The switching circuit 702 may be configured to detect an event. The event may be internal to the device 602, such as a change in the power or connectivity characteristics of the device 602. The event may be external to the device, such as a characteristic of the communication system 100 (e.g., traffic, available nodes, system-wide status, an active communication protocol), time, and temperature. The switching circuit 702 may be synchronized with other switching circuits 702 included in other devices 602. In some implementations, the switching circuit 702 may synchronize using a signal synchronization scheme used by the communication system 100. For example, in some cellular systems including OFDM, signals may be synchronized using synchronization signals. The switching circuit 702 may be configured to switch between the subscriber unit circuit 704 and the base station circuit 706 based on a schedule. The schedule may be stored in the memory 606 and retrieved by the switching circuit 702. The switching circuit 702 may be configured to switch in response to a signal from the processor units 604.

The switching circuit 702 may be configured to maintain a state for the device 602. The state may be stored in memory of the switching circuit 702 or other memory 606 of the device 602. The state may indicate a mode or modes of operation the device 602 is currently configured for. In a first mode, the device 602 may be configured to provide radio access services. In this first mode, the base station circuit 706 may be activated. In a second mode, the device 602 may be configured to request subscriber services from an AP. In this second mode, the subscriber unit circuit 704 may be activated. In some implementations, the device 602 may be configured to operate in both the first and the second modes simultaneously. In some implementations, the device 602 may be configured to periodically switch between the first mode and the second mode.

In some implementations, it may be desirable for the device 602 to maintain a connection with the AP while providing radio access service to another STA. For example, to conserve bandwidth, some APs or STAs may be configured to disconnect if no signal traffic is detected. In some implementations, the switching circuit 702 may cause a signal (e.g., heartbeat, keep-alive) to be periodically transmitted from the device 602 to the AP. This may prevent the device 602 from disconnecting from the AP and having to request subscriber services from the AP each time the subscriber unit circuit 704 is activated. The device 602 may also be disconnected from the AP when the service provided by the AP is lost, particularly in a mesh machine-to-machine context where the network may be fluid.

Although a number of separate components are illustrated in FIG. 7, those of skill in the art will recognize that one or more of the components may be combined or commonly implemented. For example, the base station circuit 706 may be used to implement not only the functionality described above with respect to the base station circuit 706, but also to implement the functionality described above with respect to the security circuit 708. Further, each of the components illustrated in FIG. 7 may be implemented using a plurality of separate elements.

In conjunction with one or more of the embodiments described herein, an apparatus is disclosed that may include means for transmitting a message from a first device to a second device. The means for transmitting may include the transceiver 146 of FIG. 1, the transmitter 610 of FIG. 6, one or more other devices or circuits configured to transmit the message from a first device to the second device, or any combination thereof.

The apparatus may also include means for establishing a first communication link between the first device and the second device based on the access data. The means for establishing may include the transceiver 146 of FIG. 1, the processor 122 of FIG. 1, the transmitter 610 of FIG. 6, the processor units 604 of FIG. 6, the M2M processor 640 of FIG. 6, one or more other devices or circuits configured to establish the first communication link, or any combination thereof.

The apparatus may also include means for receiving, via the first communication link, second information associated with establishment of a second communication link between the first device and a third device. The means for receiving may include the transceiver 146 of FIG. 1, the receiver 612 of FIG. 6, one or more other devices or circuits configured to receive the second information, or any combination thereof.

The apparatus may also include means for configuring the first device to establish the second communication link between the first device and the third device based on the second information. The means for configuring may include the processor 122 of FIG. 1, the processor units 604 of FIG. 6, the M2M processor 640 of FIG. 6, one or more other devices or circuits configured to configure the first device, or any combination thereof.

The apparatus may also include means for receiving, from a first device, a message at a second device. The means for receiving may include the transceiver 118 of FIG. 1, the receiver 612 of FIG. 6, one or more other devices or circuits configured to receive the message, or any combination thereof.

The apparatus may also include means for obtaining access data associated with establishing a first communication link between the first device and the second device. The means for obtaining access data may include the processor 112 of FIG. 1, the processor units 604 of FIG. 6, the M2M processor 640 of FIG. 6, one or more other devices or circuits configured to obtain access data, or any combination thereof.

The apparatus may also include means for establishing the first communication link between the first device and the second device based on the message. The means for establishing the first communication link may include the transceiver 118 of FIG. 1, the processor 112 of FIG. 1, the processor units 604 of FIG. 6, the M2M processor 640 of FIG. 6, the transmitter 610 of FIG. 6, one or more other devices or circuits configured to establish the first communication link, or any combination thereof.

The apparatus may also include means for transmitting to the first device, via the first communication link, second information associated with establishment of a second communication link between the first device and a third device. The means for transmitting may include the transceiver 118 of FIG. 1, the transmitter 610 of FIG. 6, one or more other devices or circuits configured to transmit, or any combination thereof.

One or more of the disclosed embodiments may be implemented in a system or an apparatus (e.g., the STA 110 of FIG. 1, the M2M device 120 of FIG. 1, the computer 310 of FIG. 3, the refrigerator 320 of FIG. 3, or the device 602 of FIG. 6) that may include a communications device, a fixed location data unit, a mobile location data unit, a mobile phone (e.g., a smartphone), a cellular phone, a television, an access point, a computer, a tablet, a portable computer (e.g., a laptop computer), or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, a gaming device or system, navigation devices, fixed location data units such as meter reading equipment, or any other device that stores or retrieves data or computer instructions, or any combination thereof. Although one or more of FIGS. 1-7 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

The communication system 100 of FIG. 1, the communication system 300 of FIGS. 3A and 3B may operate pursuant to a wireless standard, for example an IEEE 802.11ah standard. A variety of techniques and/or protocols may be used to enable communication in the wireless communication system 100 between the AP 140 and the STA. The techniques described herein may be used in combination with various wireless technologies such as CDMA, OFDM, TDMA, and so on. Multiple user terminals (e.g., stations) can concurrently transmit and receive data via different orthogonal code channels for CDMA, time slots for TDMA, or sub-bands for OFDM. A CDMA system may implement IS-2000, IS-95, IS-856, Wideband-CDMA (W-CDMA), or some other standard. An OFDM system may implement one or more IEEE 802.11 standards or some other standards. A TDMA system may implement GSM standards or some other standards.

Popular wireless network technologies may include various types of wireless local area networks (WLANs). A WLAN may be used to interconnect nearby devices together, employing widely used networking protocols. The various aspects described herein may apply to any communication standard, such as wireless protocols. For example, the various aspects described herein may be used as part of the IEEE 802.11ah protocol, which uses sub-1 giga hertz (GHz) bands. As another example, the various aspect describe herein may be used in conjunction with a 6-9 GHz wireless network.

In some aspects, wireless signals in a sub-1 gigahertz band may be transmitted, for example, according to the 802.11ah protocol. Transmission may use OFDM, direct-sequence spread spectrum (DSSS) communications, a combination of OFDM and DSSS communications, or other schemes. Implementations of the 802.11ah protocol or other sub-1 gigahertz protocols may be used for sensors, metering, and smart grid networks. Aspects of certain devices implementing such protocols may consume less power than devices implementing other wireless protocols. These devices may be used to transmit wireless signals across a relatively long range, for example about one kilometer or longer. Implementations of other protocols (e.g., 6-9 GHz protocols) may provide for a relatively shorter range of communication, such as approximately three or four meters.

Wireless networks may operate in several modes, such as an infrastructure mode or an ad-hoc mode. During operation in the infrastructure mode, a STA may connect to an AP that serves as a hub for connecting one or more wireless clients (e.g., one or more STAs) to the network infrastructure, such as, for example, Internet access. A wireless device (e.g., a client or a station (STA)) associated with an infrastructure network may be referred to as an associated STA. In the infrastructure mode, the wireless network may use a client-server architecture to provide connectivity to the one or more wireless clients. During the ad-hoc mode, one or more wireless clients may establish direct connections to each other in a peer-to-peer architecture. In one aspect, an AP may generate a periodic beacon signal which broadcasts wireless network characteristics (e.g., a maximum data rate, an encryption status, an AP MAC address, a SSID, etc.) to nearby clients (e.g., STAs). For example, the SSID may identify a particular wireless network.

A communication link that facilitates transmission from an AP (e.g., the AP 140 of FIG. 1) to a STA (e.g., the STA 110 of FIG. 1) may be referred to as a downlink (DL), and a communication link that facilitates transmission from the STA to the AP may be referred to as an uplink (UL). Alternatively, a downlink may be referred to as a forward link or a forward channel, and an uplink may be referred to as a reverse link or a reverse channel.

The WLAN may include includes various devices, such as an AP and the STA (e.g., a client). In general, the AP serves as a hub or base station for the WLAN and the STA serves as a user of the WLAN. For example, an STA may be a laptop computer, a personal digital assistant (PDA), a mobile phone, etc. In an example, the STA connects to the AP via a wireless fidelity (Wi-Fi) (e.g., an IEEE 802.11 protocol such as 802.11ah) compliant wireless link to obtain general connectivity to the Internet or to other wide area networks. In a particular embodiment, the STA may also be used as an AP.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may include one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, and circuits steps have been described above generally in terms of their functionality. Whether such functionality is implemented as hardware or processor executable instructions depends upon the particular application and design constraints imposed on the overall system. Additionally, the various operations of methods described above may be performed in any order and by any suitable means capable of performing the operations, such as various hardware and/or software component(s), circuits, and/or module(s). Generally, any operations illustrated with respect to the FIGS. 1-7 may be performed by corresponding functional means capable of performing the operations. Skilled artisans may implement the described functionality in varying ways for each particular application, but such implementation decisions should not be interpreted as causing a departure from the scope of the present disclosure.

Those of skill would further appreciate that the various illustrative logical blocks, configurations, modules, circuits, and algorithm steps described in connection with the embodiments disclosed herein may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on as one or more instructions or code on a computer-readable medium. Computer-readable media includes computer-readable storage media and communication media including any medium that facilitates transfer of a computer program from one place to another. A storage media may be any available media that can be accessed by a computer.

By way of example, and not limitation, such computer-readable storage media can comprise random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), other optical disk storage, magnetic disk storage, or other magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

In an exemplary embodiment, the processor units 604 or the M2M processor 640 may be configured to execute processor-executable instructions (e.g., computer executable instructions) stored at a non-transitory computer-readable medium, such as the memory 606, and the processor-executable instructions are executable to cause a computer, such as the processor units 604 or the M2M processor 640, to transmit a message from a first device to a second device. The message includes first information associated with identification of the first device. The first information enables the second device to obtain access data. The processor-executable instructions are further executable to cause the computer, such as the processor units 604 or the M2M processor 640, to receive, via a first communication link between the first device and the second device based on the access data, second information associated with establishment of a second communication link between the first device and a third device. The processor-executable instructions are further executable to cause the computer, such as the processor units 604 or the M2M processor 640, to configure the first device to establish the second communication link between the first device and the third device based on the second information.

In another exemplary embodiment, the processor units 604 or the M2M processor 640 may be configured to execute processor-executable instructions (e.g., computer executable instructions) stored at a non-transitory computer-readable medium, such as the memory 606, and the processor-executable instructions are executable to cause a computer, such as the processor units 604 or the M2M processor 640, to receive, from a first device, a message at a second device. The message includes first information that identifies the first device. The processor-executable instructions are further executable to cause the computer, such as the processor units 604 or the M2M processor 640, to receive access data associated with establishing a first communication link between the first device and the second device. The processor-executable instructions are further executable to cause the computer, such as the processor units 604 or the M2M processor 640, to establish the first communication link between the first device and the second device based on the message. The processor-executable instructions are further executable to cause the computer, such as the processor units 604 or the M2M processor 640, to transmit to the first device, via the first communication link, second information associated with establishment of a second communication link between the first device and a third device.

The wireless device 602 may include one or more optional components (not shown). For example, the wireless device may include a display controller. The display controller may be coupled to the processor units 604, the M2M processor 640, the bus system 626, the user interface 622, or a combination thereof. The display controller may be coupled to a display device included in or external to the wireless device 602. The wireless device 602 may also include a coder/decoder (CODEC) that can also be coupled to the processor units 604, the M2M processor 640, the bus system 626, the user interface 622, or a combination thereof. A speaker and a microphone can be coupled to the CODEC.

In a particular embodiment, the processor units 604, the M2M processor 640, the memory 606, the wireless transceiver 614, and the signal detector 618 are included in a system-in-package or system-on-chip device included in the wireless device 602. In a particular embodiment, an input device and a power supply are coupled to the system-on-chip device. Moreover, in a particular embodiment, the display device, the input device, the speaker, the microphone, the antennas 616, and the power supply are external to the system-on-chip device. However, each of the display device, the input device, the speaker, the microphone, the antennas 616, and the power supply can be coupled to a component of the system-on-chip device of the wireless device 602, such as an interface or a controller.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD) or floppy disk, etc.). Moreover, any other suitable technique for providing the methods and techniques described herein to a device can be utilized.

One of ordinary skill in the art should understand that methods or processes, such as the process 200 of FIG. 2, the method 400 of FIG. 4, and the method 500 of FIG. 5, described herein are merely illustrative. One or more of the steps of the methods (e.g., processes) may be removed, additional steps may be added, the order of steps changed, or combinations thereof, while still remaining consistent with the disclosure herein.

The process 200 of FIG. 2, the method 400 of FIG. 4, the method 500 of FIG. 5, or any combination thereof, may be implemented or otherwise performed by a field-programmable gate array (FPGA) device, an application-specific integrated circuit (ASIC), a processing unit such as a central processing unit (CPU), a digital signal processor (DSP), a controller, another hardware device, a firmware device, or any combination thereof.

It is to be understood that the claims are not limited to the precise configuration and components illustrated above. The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method comprising:
configuring a first device to operate in a first mode as an access point, wherein the first device comprises a machine-to-machine communication device;
receiving access data from a second device at the first device, wherein the second device comprises a station;
authenticating the second device based on the access data, wherein a first communication link is established between the first device and the second device;
receiving, via the first communication link, connectivity information associated with establishment of a second communication link between the first device and a third device, wherein the third device comprises a second access point; and
configuring the first device to operate in a second mode as a station, wherein establishing the second communication link occurs after the first device is authenticated by the third device based on the connectivity information, and wherein establishing the second communication link enables the first device to access a wireless local area network provided by the third device.

2. The method of claim 1, further comprising, after configuring the first device to operate in the first mode, transmitting a message from the first device to the second device, wherein the message comprises identification information associated with identification of the first device, and wherein the identification information enables the second device to obtain the access data.

3. The method of claim 1, wherein configuring the first device to operate in the second mode occurs after receiving the connectivity information.

4. The method of claim 1, wherein security information is included in the access data.

5. The method of claim 1, further comprising programming the first device with information corresponding to the connectivity information.

6. The method of claim 5, wherein programming the first device comprises:
unlocking a portion of a memory of the first device in response to the first communication link being established; and
storing the connectivity information received from the second device in the portion of the memory.

7. The method of claim 1, further comprising configuring the first device to operate in accordance with a combination of the first mode and the second mode.

8. The method of claim 1, further comprising:
after configuring the first device to operate in the first mode, transmitting a first message from the first device to the second device, wherein the message comprises identification information associated with identification of the first device; and
after establishing the second communication link, transmitting a second message from the first device to the second device via the third device.

9. A wireless communication device comprising:
access point logic configured to enable a first device to operate in a first mode as an access point, wherein the first device comprises a machine-to-machine device;
a transceiver configured to receive access data from a second device and configured to facilitate authenticating the second device based on the access data, wherein the second device comprises a station, wherein after an authentication of the second device the transceiver is configured to receive, via a first communication link between the first device and the second device, connectivity information associated with establishment of a second communication link between the first device and a third device, and wherein the third device comprises a second access point;
a processor configured to program the first device to establish the second communication link between the first device and the third device based on the connectivity information; and
station logic configured to enable the first device to operate in a second mode as a station, wherein establishing the second communication link occurs after the first device is authenticated by the third device based on the connectivity information, and wherein establishing the second communication link enables the first device to access a wireless local area network provided by the third device via the second communication link.

10. The wireless communication device of claim 9, wherein the processor is configured to authenticate the second device and to establish the first communication link.

11. The wireless communication device of claim 9, wherein, when the first device is in the first mode, the transceiver is configured to transmit a message from the first device to the second device, wherein the message comprises identification information associated with identification of the first device, and wherein the identification information enables the second device to obtain the access data.

12. The wireless communication device of claim 11, wherein the access data comprises security information associated with the first device.

13. The wireless communication device of claim 9, wherein the access data includes one or more instructions associated with authenticating the second device to establish the first communication link with the first device.

14. The wireless communication device of claim 9, further comprising security logic, wherein the access data comprises security information associated with the first device, and wherein the first device is configured to operate based on the security logic to authenticate the second device.

15. The wireless communication device of claim 9, wherein, when the first device is in the first mode, the transceiver is configured to broadcast a message, wherein the message comprises a beacon detectable by the second device, and wherein the beacon comprises an identification code associated with the first device.

16. The wireless communication device of claim 9, wherein, when the first device is in the first mode, the transceiver is configured to transmit a service set identification (SSID) associated with the first device.

17. The wireless communication device of claim 9, wherein the connectivity information comprises a service set identification (SSID) associated with the third device, security information associated with the third device, or a combination thereof.

18. The wireless communication device of claim 9, wherein the access data is associated with establishing the first communication link between the first device and the second device and further comprising switching logic, wherein operation of the first device based on the switching logic enables a mode of the first device to be changed from operating in the second mode using the station logic to operating in the first mode using the access point logic, and vice versa.

19. An apparatus comprising:
means for transmitting a message from a first device to a second device, wherein the message comprises first information associated with identification of the first device, wherein the first information enables the second device to obtain access data;
means for configuring the first device to operate in a first mode as an access point, wherein the first device comprises a machine-to-machine communication device;
means for receiving access data from the second device at the first device, wherein the second device comprises a station;
means for authenticating the second device based on the access data, wherein a first communication link is established between the first device and the second device;
means for receiving, via the first communication link, connectivity information associated with establishment of a second communication link between the first device and a third device, wherein the third device comprises a second access point; and
means for configuring the first device to operate in a second mode as a station, wherein establishing the second communication link occurs after the first device is authenticated by the third device based on the connectivity information and enables the first device to access a wireless local area network provided by the third device via the second communication link.

20. The apparatus of claim 19, further comprising means for authorizing the second device to program the connectivity information to the first device, wherein the connectivity information is received, by the means for receiving, from the second device.

21. The apparatus of claim 19, further comprising:
means for unlocking a portion of a memory of the first device in response to the first communication link being established; and
means for storing the connectivity information in the unlocked portion of the memory.

22. A non-transitory processor-readable medium comprising instructions that, when executed by a processor, cause the processor to:
   configure a first device to operate in a first mode as an access point, wherein the first device comprises a machine-to-machine communication device;
   authenticate a second device based on access data provided by the second device, wherein the second device comprises a station, and wherein a first communication link is established between the first device and the second device;
   receive, via the first communication link connectivity information associated with establishment of a second communication link between the first device and a third device, wherein the third device comprises a second access point; and
   configure the first device to operate in a second mode as a station, wherein establishing the second communication link occurs after the first device is authenticated by the third device based on the connectivity information and enables the first device to access a wireless local area network provided by the third device via the second communication link.

23. A method comprising:
   receiving, from a first device, a message at a second device, wherein the message comprises identification information that identifies the first device, wherein the first device comprises a machine-to-machine communication device operating as an access point, and wherein the second device comprises a station;
   providing access data to the first device, wherein the access data is associated with establishing a first communication link between the first device and the second device, wherein, after the second device is authenticated by the first device, the first communication link is established between the first device and the second device; and
   transmitting to the first device, via the first communication link, connectivity information associated with establishment of a second communication link between the first device and a third device operating as a second access point, wherein the connectivity information corresponds to the first device operating as a station and being authenticated by the third device to establish the second communication link.

24. The method of claim 23, wherein the identification information enables the second device to obtain the access data, wherein the access data is provided by the second device, and wherein the second device provides the access data occurs after the second device obtains the access data.

25. The method of claim 23, wherein providing the access data comprises: after receiving the access data from a fourth device associated with a manufacturer of the first device, transmitting a portion of the access data to the first device.

26. The method of claim 25, wherein the access data comprises security information causing a portion of a memory of the first device to be unlocked.

27. The method of claim 25, wherein the fourth device comprises a server associated with the manufacturer or comprises a portable memory storage device provided by the manufacturer.

28. A wireless communication device comprising:
   a receiver configured to:
      receive, from a first device, a message at a second device, wherein the message comprises identification information that identifies the first device, wherein the first device comprises a machine-to-machine communication device operating as an access point, and wherein the second device comprises a station; and
      receive access data associated with an authentication procedure to enable establishing a first communication link between the first device and the second device;
   a processor configured to generate instructions to establish the first communication link between the first device and the second device; and
   a transmitter configured to transmit to the first device, via the first communication link, connectivity information associated with establishment of a second communication link between the first device and a third device operating as a second access point, wherein the connectivity information corresponds to the first device operating as a station and being authenticated by the third device to establish the second communication link.

29. The wireless communication device of claim 28, wherein the identification information comprises a service set identification (SSID) associated with the first device.

30. The wireless communication device of claim 28, wherein the message comprises a beacon that is broadcasted from the first device and that is detectable by the second device.

31. The wireless communication device of claim 28, wherein the access data includes security information associated with the first device, and wherein the transmitter is configured to transmit the access data to the first device.

32. The wireless communication device of claim 28, wherein the connectivity information enables the first device to establish the second communication link with the third device, and wherein the connectivity information comprises a service set identification (SSID), a password, security information, authentication credentials, other access credentials, or a combination thereof, associated with the third device.

33. The wireless communication device of claim 28, wherein the message comprises an identification code associated with the first device.

34. An apparatus comprising:
   means for receiving, from a first device, a message at a second device, wherein the message comprises identification information that identifies the first device, wherein the first device comprises a machine-to-machine communication device operating as an access point, and wherein the second device comprises a station;
   means for obtaining access data associated with establishing a first communication link between the first device and the second device, wherein the second device is authenticated by the first device based on the access data;
   means for establishing the first communication link between the first device and the second device; and
   means for transmitting to the first device, via the first communication link, connectivity information associated with establishment of a second communication link between the first device and a third device operating as a second access point, wherein the connectivity information corresponds to the first device operating as a station and being authenticated by the third device to establish the second communication link.

35. The apparatus of claim 34, further comprising:
   means for receiving the access data from a fourth device associated with a manufacturer of the first device; and
   means for transmitting a portion of the access data to the first device via the first communication link prior to transmission of the second information.

36. A non-transitory processor-readable medium comprising instructions that, when executed by a processor, cause the processor to:
- receive, from a first device, a message at a second device, wherein the message comprises identification information that identifies the first device, wherein the first device comprises a machine-to-machine communication device operating as an access point, and wherein the second device comprises a station;
- receive, at the second device, access data associated with establishing a first communication link between the first device and the second device, wherein the second device is authenticated by the first device based on the access data;
- establish the first communication link between the first device and the second device; and
- transmit to the first device, via the first communication link, connectivity information associated with establishment of a second communication link between the first device and a third device operating as a second access point, wherein the connectivity information corresponds to the first device operating as a station and being authenticated by the third device to establish the second communication link.

* * * * *